United States Patent [19]

Ramsay

[11] 4,152,105
[45] May 1, 1979

[54] PERCUSSIVELY-IGNITABLE FLASHLAMP ASSEMBLY AND SELECTIVE FIRING MECHANISM THEREFOR UTILIZING MOVABLE RETENTION MEANS

[75] Inventor: John P. Ramsay, Hillsboro, N.H.

[73] Assignee: GTE Sylvania Incorporated, Stamford, Conn.

[21] Appl. No.: 778,394

[22] Filed: Mar. 17, 1977

[51] Int. Cl.² .............................................. F21K 5/02
[52] U.S. Cl. .................................... 431/359; 431/361; 362/11
[58] Field of Search ........................... 431/92, 93, 97; 240/1.3

[56] References Cited
U.S. PATENT DOCUMENTS

| 3,735,111 | 5/1973 | Shaffer | 431/93 |
| 3,753,390 | 8/1973 | Hough et al. | 431/93 |
| 3,765,079 | 10/1973 | Pfeffede et al. | 431/93 |
| 3,980,421 | 9/1976 | Heeman et al. | 431/93 |
| 4,070,145 | 1/1978 | Hall, Jr. et al. | 431/93 |
| 4,076,488 | 2/1978 | Hall, Jr. | 431/93 |

Primary Examiner—Henry C. Yuen
Attorney, Agent, or Firm—Lawrence R. Fraley

[57] ABSTRACT

An improved flashlamp assembly which utilizes a plurality of percussively-ignitable flashlamps disposed on an elongated support member. Firing of the flashlamps is accomplished using a spring-loaded ratchet, a movable carriage, and a striking mechanism, e.g. helical torsion spring, positioned on the movable carriage and in engagement with the ratchet. The spring engages and fires each of the lamps in response to the movement of the ratchet and carriage within the support member. The improvement comprises a movable retention means for fixedly retaining the assembly's carriage prior to the selective firing of the flashlamps. An improved selective firing mechanism is also disclosed.

8 Claims, 6 Drawing Figures

PERCUSSIVELY-IGNITABLE FLASHLAMP ASSEMBLY AND SELECTIVE FIRING MECHANISM THEREFOR UTILIZING MOVABLE RETENTION MEANS

CROSS REFERENCE TO COPENDING APPLICATIONS

An application listed in the Patent and Trademark Office under Ser. No. 778,395 was filed Mar. 17, 1977 and is assigned to the same assignee as the present invention. Ser. No. 778,395 defines a flashlamp assembly which utilizes means for providing a prolonged illumination subsequent to the firing of each lamp.

Three applications, listed under Ser. Nos. 756,926, 756,927, and 756,928 were filed Jan. 4, 1977 and assigned to the same assignee as the present invention. Ser. No. 756,927 describes a flashlamp assembly utilizing a plurality of percussively-ignitable flashlamps disposed on a support member. A movable carriage is used to maintain alignment of the assembly's striking mechanism during firing of the lamps. Ser. No. 756,928 describes a signal device which also includes a plurality of percussively-ignitable flashlamps disposed on a support. A handle and movable trigger are employed in conjunction with the device's firing mechanism to accomplish firing of the lamps. Ser. No. 756,926 is an application for a design for a flashlamp assembly.

Anoter previous application, Ser. No. 696,146 (H. H. Hall et al), filed June 14, 1976 now U.S. Pat. No. 4,076,488 and assigned to the same assignee as the present invention, defines a flashlamp assembly which employs a spring-loaded ratchet bar and a slidable member, e.g., helical torsion spring, which fires the assembly's flashlamps during movement of the ratchet bar Ser. No. 696,146 is now U.S. Pat. No. 4,076,488.

Two additional applications filed June 14, 1976 are now U.S. Pat. Nos. 4,070,145 (H. H. Hall et al) and 4,055,759 (Bouchard et al) and are also assigned to the same assignee as the present invention. Both of these patents describe percussive flashlamp signal devices wherein each of the lamps has a preenergized striker, e.g. torsion spring, associated therewith.

BACKGROUND OF THE INVENTION

The present invention relates to flashlamp assemblies and particularly to flashlamp assemblies which employ flashlamps of the percussively-ignitable variety. The invention also relates to selective firing mechanisms for use in these assemblies.

One of the primary features of the instant invention is the prevention of accidental flashlamp ignition within a flashlamp assembly utilizing a movable carriage as part of the firing mechanism. Such an assembly was described in the aforementioned application under Ser. No. 756,927. Understandably, accidental and premature firing of the assembly's lamps reduces the operating capacity of the assembly.

It is believed therefore that an improved flashlamp assembly which provides a means for preventing accidental, premature ignition of the assembly's lamps would constitute an advancement in the art.

It is also believed that a flashlamp assembly selective firing mechanism which provides the above capability would constitute an art advancement.

OBJECTS AND SUMMARY OF THE INVENTION

It is therefore a primary object of the instant invention to enhance the flashlamp assembly art.

It is another object of the invention to provide a percussively-ignitable flashlamp assembly which utilizes means for preventing accidental ignition of the assembly's flashlamps.

It is still another object of the invention to provide a selective firing mechanism for a flashlamp assembly using percussively-ignitable flashlamps which prevents accidental firing of the assembly's flashlamps.

A further object of the invention is to provide a flashlamp assembly of the nature described wherein the assembly may be utilized as a hand-operable signal device.

In accordance with one aspect of the present invention, there is provided a percussively-ignitable flashlamp assembly which comprises a support member defining a plurality of channels therein, a spring-loaded ratchet member movably oriented within one of the support's channels, a striking mechanism which is in engageable contact with the ratchet and is capable of selectively firing the flashlamps, and a slidable carriage member which moves within a second of the support's channels and has the described striking mechanism located thereon. A movable retention means is employed to positively retain the carriage in a fixed position prior to the selective firing of the flashlamps. Accordingly, accidental and premature ignition of the lamps is prevented.

According to another aspect of the invention, there is provided a selective firing mechanism for a flashlamp assembly which includes a support member, a plurality of percussively-ignitable flashlamps positioned on the support, a spring-loaded ratchet, a resilient striking mechanism, and a movable carriage upon which the striking mechanism is positioned. A movable retention means is used to prevent accidental ignition of the assembly's lamps by positively retaining the assembly's carriage in a fixed position prior to selective firing thereof.

DETAILED DESCRIPTION OF THE PREFERRED EMBODIMENT

For a better understanding of the present invention together with other and further objects, advantages, and capabilities thereof, reference is made to the following disclosure and appended claims in connection with the above described drawings.

With reference to the drawings, there is shown an improved flashlamp assembly 10 which comprises an elongated support member 13 upon which are mounted a plurality of flashlamps 15. Each lamp 15 is of the percussively-ignitable variety similar to those defined in U.S. Letters Patent No. 3,535,063 (L. F. Anderson et al), said patent assigned to the same assignee as the present invention. The percussive flashlamps described in U.S. Pat. No. 3,535,063 comprise a light-transmitting envelope and a projecting primer tube. Deformation of the tube results in a deflagration of the lamp's fulminating material up through the tube and the subsequent ignition of the combustible filamentary material, e.g., zirconium foil, located within the envelope. This ignition process is often termed in the flashlamp industry as "firing" of the lamp.

Figure 2:
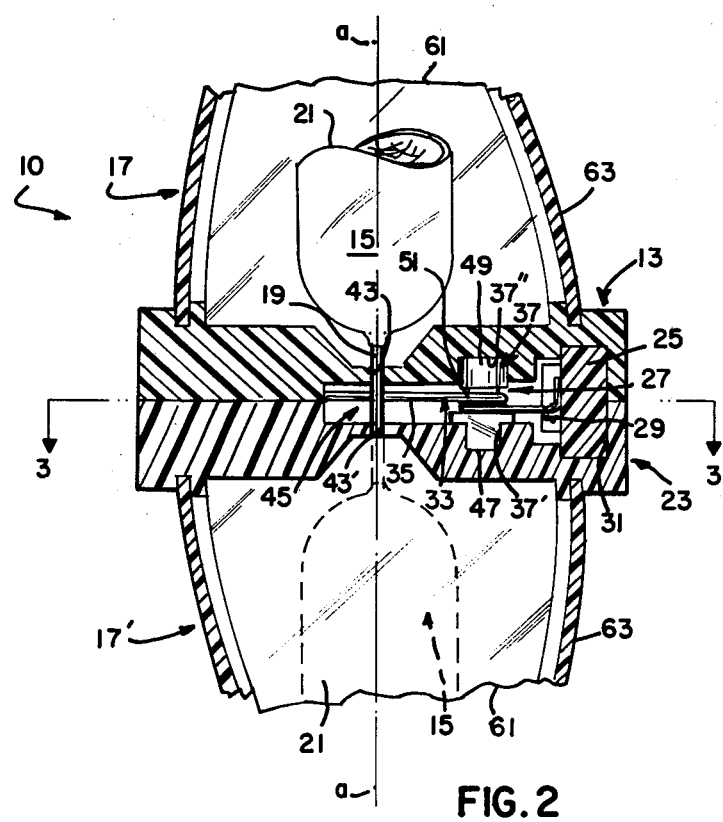
FIG. 2 is an end elevational view, partly in section, of the assembly of FIG. 1 as taken along the line 2—2 in FIG. 1.

The lamps 15 of the invention are preferably arranged on support 13 in two opposing and substantially parallel rows 17 and 17'. Accordingly, the lamps in row 17' are inverted with respect to those in row 17 and the respective primer tubes 19 project from envelopes 21 in opposing directions. This preferred positioning relationship is best illustrated in FIG. 2. It is further preferred that the lamps in row 17' be alternatively positioned on support 13 with respect to the opposing lamps in row 17 and that the respective projecting primer tubes occupy a common plane "a—a" as shown in FIG. 2.

Selective firing of the flashlamps 15 is accomplished by the assembly's firing mechanism 23 (FIGS. 2-4) which comprises a spring-loaded ratchet member 25, a movable carriage member 27, and a resilient striking mechanism 29. Ratchet 25 is slidably positioned within a first longitudinal channel 31 defined by support 13. Striking mechanism 29, preferably a helical torsion spring 33 having an extending striker arm 35 for selectively engaging and thus deforming each of the projecting primer tubes 19 of lamps 15, is located on carriage 27 and is thereby assured of proper alignment during movement through support 13.

As shown, carriage 27 is slidably positioned within a second longitudinal channel 37 defined within support 13 and which includes a first open or slotted portion 37' and a second open or slotted portion 37". Engagement and deformation of primer tubes 19 is achieved by reciprocal movement (direction "b" in FIGS. 3, 4) of ratchet 25 within first channel 31.

Spring 33, which also includes a leg portion 39 in engagement with the ratchet teeth 41 on ratchet 25, is thus forced to move laterally (direction "c" in FIG. 3) in response to this reciprocal movement as well as the resulting sliding movement of carriage 27 within channel 37. Striker arm 35 of spring 33 will thereby swing up and strike the primers 19 to cause deformation thereof. Continued movement in direction "c" causes the striker arm 35 to pass under the deformed primer and strike the next (adjoining) primer. It can therefore be seen that spring 33 does not move during the return movement (opposite direction "c") of ratchet 25 due to the engagement of a wall 71 by the end portion of arm 35 at the start of this movement and the ability of leg portion 39 to slide over the respective tooth on the ratchet. It can further be seen that each of the primer tubes 19 of a fired flashlamp serves to re-tention spring 33 prior to the next firing sequence.

Figure 3:
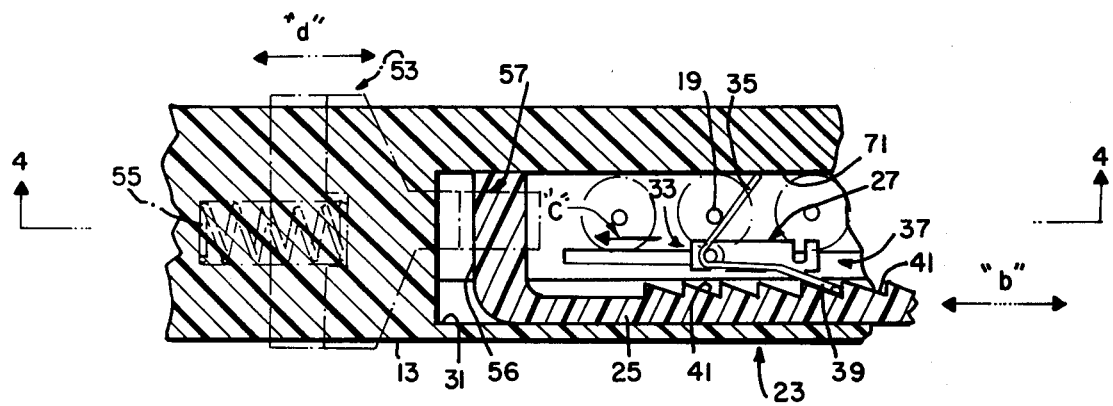
FIG. 3 is a plan view, in section, as taken along the line 3—3 in FIG. 2.

Support 13 is shown in FIGS. 2 and 3 as containing a plurality of spaced openings 43 therein, each of which is adapted for accommodating a respective one of the primers 19 of lamps 15. It is additionally preferred to provide a plurality of secondary openings 43' each in alignment with a respective opening 43 and spaced a predetermined distance therefrom. Accordingly, when each primer 19 is located within both of the openings 43 and 43', the respective spacing therebetween defines a third longitudinal channel 45 within support 13. It can be seen in FIG. 2 that striker arm 35 extends within channel 45 and is thus adapted for engaging the portion of primer tube 19 located therein. In the broader aspects of the invention, it is understood that channel 45 can be omitted and only singular opening 43 (or 43') provided to accommodate one of the primers. The arrangement shown in FIG. 2 is preferred, however, to provide a dual, spaced retention on each primer 19 with the necessary striking engagement occuring therebetween. When utilizing the three longitudinal channels 31, 37, and 45, it is preferred that the three be positioned within support 13 in a substantially parallel relationship.

Carriage 27 is shown in FIG. 2 as comprising first and second opposing end portions 47 and 49 slidably oriented within open portions 37' and 37", respectively, of second channel 37. Carriage 27 further comprises a central portion 51 located between ends 47 and 49 and adapted for having helical spring 33 positioned thereon. Orientation of both opposing ends 47 and 49 within channel 37 prevents tilting or similar misalignment during the carriage's lateral movement. In the preferred embodiment of the invention, end 47 of carriage 27 is of a boxlike configuration while end 49 and central portion 51 are substantially cylindrical in shape.

Figure 1:
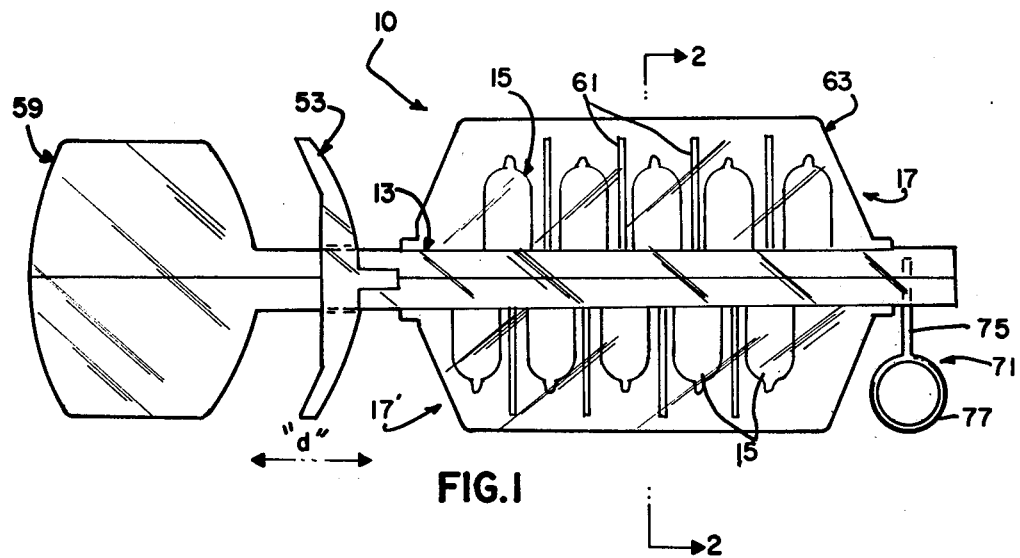
FIG. 1 is a side elevational view of a flashlamp assembly in accordance with a preferred embodiment of the invention.
Figure 4:
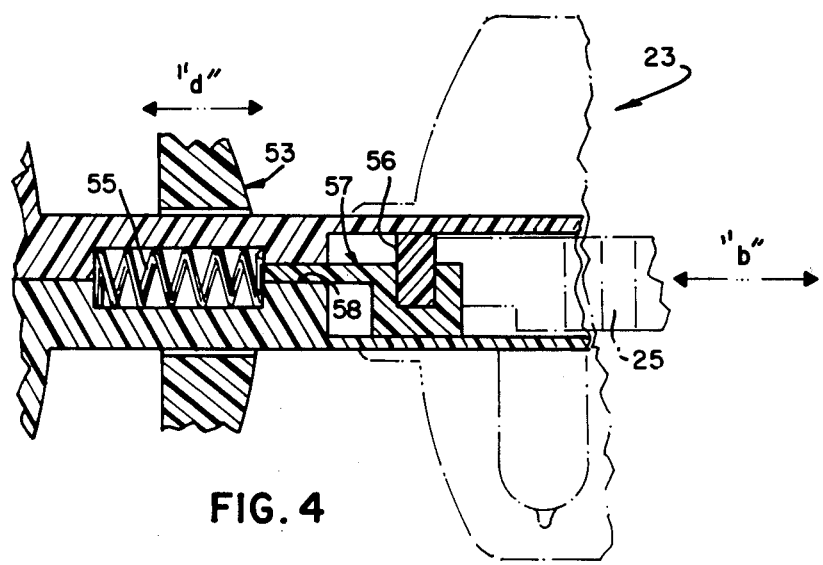
FIG. 4 is a side elevational view, in section, as taken along the line 4—4 in FIG. 3.

A preferred use for flashlamp assembly 10 is as a signal device capable of being operated by hand. As will be described, the device is adapted for single-handed operation and permits the operator to issue a signal or series of signals of relatively high luminous intensity to indicate a condition of distress, warning, etc. When used in this manner, assembly 10 preferably further includes a hand-operable trigger 53 movably oriented on and extending from elongated support 13. Trigger 53 is operatively joined to ratchet 25 by connecting arm 57 which forms a part of the trigger. Trigger 53 is also spring-biased within support 13 using spring 55. A slot 58 (FIG. 4) is provided in support 13 to accommodate arm 57. Spring 55 biases trigger 53 in a direction toward ratchet 25 to thus assure return of the trigger after actuation (displacement away from flashlamps 15) by the oprator's hand. The direction for this displacement and biased return is indicated in FIGS. 1, 3, and 4 as directional arrows "d". Because trigger 53 and ratchet member 27 are operatively joined via connecting arm 57 and move in the manner indicated, it is understood that directions "b" and "d" are substantially parallel and further that spring 55 also serves to bias ratchet 25 (away from handle 59). In the event that a trigger as shown in the drawings is not utilized as part of assembly 10, springloading ratchet 25 could be accomplished with a minor modification to the support's structure to include spring 55 at a location suitable to position it directly against one of the surfaces, e.g. 56, of the ratchet.

If it is desired to use assembly 10 as a signal device, it is additionally preferred to provide the assembly with a handle 59 extending from support 13. Handle 59 is designed to fit snugly within the palm of an operator's hand and thus trigger 53 can be actuated by one or more of the operator's fingers. Handle 59 can be hollow to serve as a storage compartment for an indicating dye, said material particularly desired for marine applications. A hollow handle could also include styrofoam or similar material to add buoyancy to assembly 10.

Assembly 10 further preferably includes a plurality of light-shield partitions 61 located on support 13, each of these members positioned between a respective pair of flashlamps to eliminate sympathetic flashing of one lamp as a result of prior flashing of an adjoining lamp. Assembly 10 may also include a light-transmitting cover 63 securely positioned on support 13 and adapted for covering lamps 15. In the embodiment shown in FIG. 1 wherein two opposing parallel rows of lamps are used, it is preferred to employ a cover 63 for each row. It is further preferred that each of the covers 63 be hermetically sealed to support 13, particularly if device 10 is to be utilized for marine use.

In addition to the above-described components, the signal device assembly may include a sheet of reflecting material (not shown) along the interior of one of the side walls of covers 63. The reflecting surface of this sheet may be inserted so as to face the lamps and function as a reflector of visible light to enhance the signaling affect or as a mirror for daytime signaling purposes. The exterior surfaces of partitions 61 may also be made reflecting, such as by aluminizing, if desired. In addition to the reflector to the above-described components, the signal device assembly may include a sheet of reflecting material (not shown) along the interior of one of the side walls of covers 63. The reflecting surface of this sheet may be inserted so as to face the lamps and function as a reflector of visible light to enhance the signaling affect or as a mirror for daytime signaling purposes. The exterior surfaces of partitions 61 may also be made reflecting, such as by aluminizing, if desired. In addition to the reflector sheet insert, a filter sheet (not shown) such as a cellulose acetate color filter may be secured to the entire inside surface of the cover. This color filter, whether blue, yellow, orange, red, or another color, may serve to draw attention to the device upon firing as well as enhance the device's decorative feature.

Figure 5:
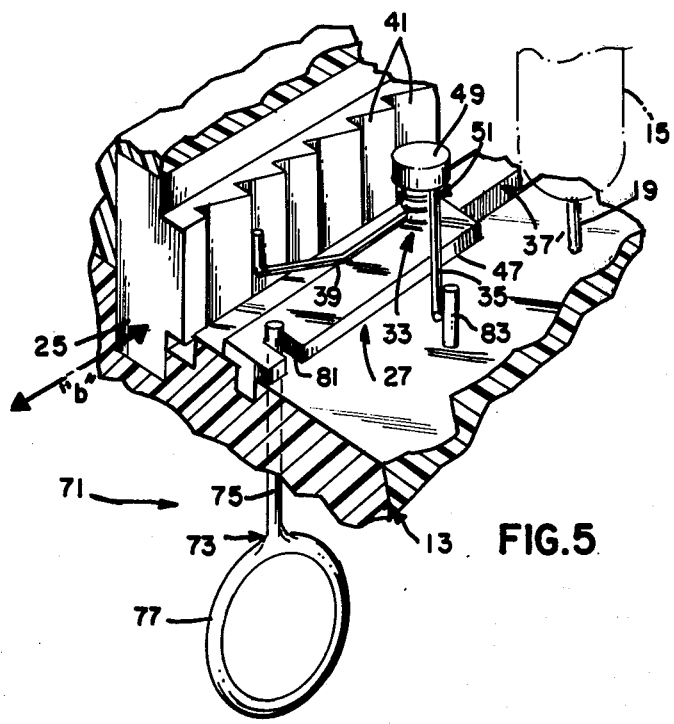
FIG. 5 is an isometric view of the preferred movable retention means for use with the assembly of FIGS. 1-4.
Figure 6:
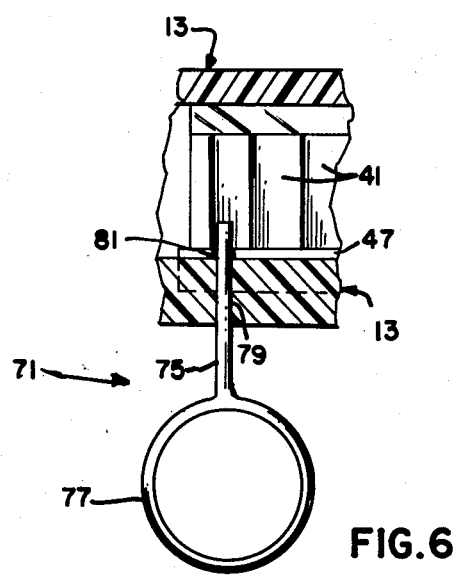
FIG. 6 is a side elevational view of the retention mens of FIG. 5.

In FIGS. 5 and 6 there is shown a movable retention means 71 adapted for use within the flashlamp assembly 10 of FIG. 1. (Means 71 is shown in FIG. 1 as being positioned substantially within support 13). Retention means 71 preferably comprises a pin member 73 having an elongated portion 75 and an adjoining annular portion 77. As will be described, annular portion 77 is adapted for receiving at least one of the operator's fingers to effect removal of pin 73 from support 13.

Elongated portion 75 inserts within a pair of aligned openings 79 and 81 within support and carriage members 13 and 27, respectively, to retain carriage 27 in a fixed position within open portion 37' of channel 37. Openings 79 and 81 are adapted for aligning within assembly 10 prior to the selective firing of flashlamps 15. Also shown in FIG. 5 is spring 33 positioned about central portion 51 of carriage 27. Ends 47 and 49 are also illustrated. Ratchet 25, including teeth 41, is operatively joined to spring 33 via leg portion 39 of the spring. It is understood from the foregoing description that ratchet 25 reciprocally moves in direction "b" to advance carriage 27 (and therefore spring 33) toward the respective flashlamps 15 whereupon striker arm 35 will strike and deform each of the primers 19.

To facilitate assembly of the present invention, a retention plug 83 (FIG. 5) may be inserted within support 13 prior to location of carriage 27 and spring 33. Plug 83 and elongated portion 75 of pin 73 serve to maintain the spring and carriage components in an aligned and prestressed condition during subsequent assembly procedures. A prestressed condition for arm 35 is also particularly desired in order to preload the arm for the firing of the initial lamp of the assembly.

As described, movable retention means 71 provides two key features of the present invention. Firstly, means 71 prevents accidental, premature firing of the lamps 15 within the assembly by maintaining carriage 27 (and therefore spring 33) in a fixed, locked condition. Secondly, means 71 serves to facilitate assembly of the invention by assisting in maintaining alignment of the invention's carriage and spring members during subsequent assembly procedures.

Support 13, handle 59, trigger 53, ratchet member 25, carriage 27, and partitions 61 are all preferably of a thermoplastic material. Covers 63 may be of transparent thermoplastic material while spring 33 may be of 0.029 inch dia. piano wire. The preferred material for pin 73 is 0.030 inch dia. stainless steel wire while plug 83 is preferably of 0.060 music wire.

Although the invention has been described with respect to specific embodiments, it will be appreciated that modifications and changes may be made by those skilled in the art without departing from the scope of the invention. For example, the dimensions and design of the helical torsion spring may be modified. In fact, in lieu of the helical torsion spring, other types of striking mechanisms with resilient striker means may be employed. The lamps may be aligned in a linear array on one side of the support member, rather than in the opposing array illustrated. The ratchet may be actuated by hand engageable means other than a biased trigger of the configuration shown. Further, although specifically illustrated as a signal device, it is readily contemplated that the described flashlamp assembly with selective firing mechanism may be adapted as a photoflash unit by the addition of suitable reflectors and provision of an appropriate linkage to a camera shutter release mechanism.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a flashlamp assembly comprising an elongated support member defining a plurality of longitudinal channels therein, a spring-loaded elongated ratchet member slidably positioned within a first of said longitudinal channels, a carriage member slidably positioned within a second of said longitudinal channels, a plurality of percussively-ignitable flashlamps mounted on said support member, and a resilient striking mechanism positioned on said carriage member and in engageable contact with said elongated ratchet member for selectively firing said flashlamps by engagement therewith in response to sliding movement of said ratchet member and said carriage member within said first and second longitudinal channels, respectively, the improvement comprising:

movable retention means positioned substantially within said elongated support member for positively retaining said carriage member in a fixed position prior to said selective firing of said flashlamps.

2. The improved flashlamp assembly according to claim 1 wherein said support and carrige members each include an opening therein, said openings adapted for being aligned within said flashlamp assembly prior to said selective firing of said flashlamps.

3. The improved flashlamp assembly according to claim 2 wherein said movable retention means comprises a pin member having an elongated portion inserted within both of said openings of said support and carriage members when said openings are aligned within said flashlamp assembly.

4. The improved flashlamp assembly according to claim 3 wherein said pin member further includes an annular portion adjoining said elongated portion and extending from said support member.

5. In a selective firing mechanism for a flashlamp assembly including an elongated support member defining a plurality of longitudinal channels therein and a plurality of percussively-ignitable flashlamps mounted on said support member wherein said selective firing mechanism comprises a spring-loaded ratchet member slidably positioned within a first of said longitudinal channels within said support member, a carriage member slidably positioned within a second of said longitudinal channels, and a resilient striking mechanism positioned on said carriage and in engageable contact with said ratchet member for selectively firing said flashlamps by engagement therewith in response to sliding movement of said ratchet member and said carriage member in said first and second longitudinal channels respectively, the improvement comprising:

movable retention means positioned substantially within said elongated support member for positively retaining said carriage member in a fixed position prior to said selective firing of said flashlamps.

6. The improved firing mechanism according to claim 5 wherein said support and carriage members each include an opening therein, said openings adapted for being aligned within said flashlamp assembly prior to said selective firing of said flashlamps.

7. The improved firing mechanism according to claim 6 wherein said movable retention means comprises a pin member having an elongated portion inserted within both of said openings of said support and carriage members when said openings are aligned within said flashlamp assembly.

8. The improved firing mechanism according to claim 7 wherein said pin member further includes an annular portion adjoining said elongated portion and extending from said support member.

* * * * *